Feb. 22, 1949.   S. M. BOOTH   2,462,716
TOOLHOLDER
Filed April 29, 1946

*INVENTOR.*
SHELDON M. BOOTH
BY
ATTORNEYS

Patented Feb. 22, 1949

2,462,716

UNITED STATES PATENT OFFICE 2,462,716

TOOLHOLDER

Sheldon M. Booth, Chicago, Ill.

Application April 29, 1946, Serial No. 665,809

8 Claims. (Cl. 125—39)

This invention relates to cutting tool holders and particularly to adjustable holders for dressing and finishing tools where various cutting angles of the cutting tool point can be obtained.

The main objects of this invention are to provide an adjustable tool holder with which the cutting angle of the tool can be changed without changing the working level of the cutting tool tip; to provide a cutting tool holder whereby the cutting tool can be held in a selected one of several sockets set at various angles and the cutting level of the tool tip is automatically maintained when shifting from one socket to another; to provide a cutting tool holder that is rotatable in its support to position a selected one of several tool sockets, formed at different angles, and which will automatically compensate for variations in the operating level of the cutting tool tip during rotation of the holder; and to provide an improved cutting tool holder that is of simple, one-piece construction and is easy to use and manufacture.

A specific embodiment of this invention is shown in the accompanying drawings in which.

Figure 1:
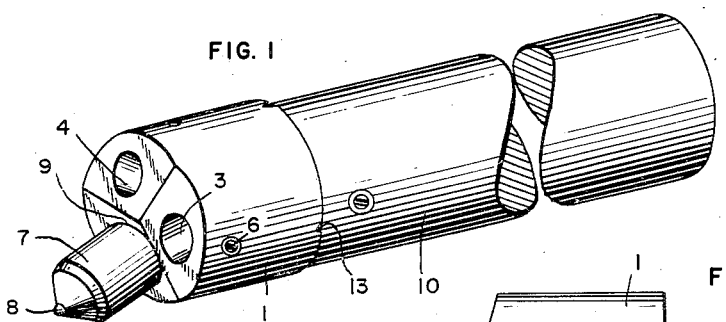
Figure 1 is a perspective view of the improved cutting tool holder mounted in an adapter shaft and having a diamond-carrying nib or cutting tool positioned in one of the sockets.
Figure 2:
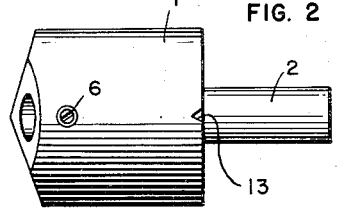
Figure 2 is a side view of the improved cutting tool holder.
Figure 3:
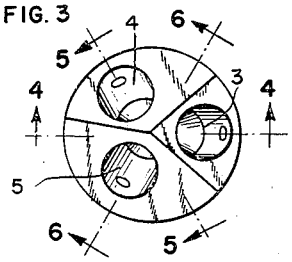
Figure 3 is a view of the socket end of the tool holder.
Figure 5:
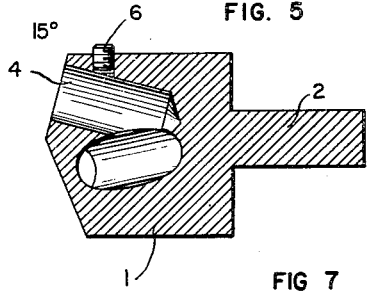
Figure 5 is a sectional view as taken on line 5—5 of Figure 3.
Figure 4:
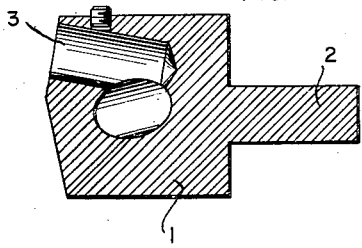
Figure 4 is a sectional view as taken on line 4—4 of Fig. 3.

In the form shown in the drawings, the improved tool holder comprises a cylindrical head or body 1 having an eccentrically positioned shank 2 extending axially, or in an axial direction, from its rear end, and a plurality of angularly spaced sockets 3, 4 and 5 in its front end, each of which sockets is set at a different predetermined angle relative to the axis of the holder body.

As shown the sockets 3, 4 and 5 are spaced substantially 120° apart angularly relative to the axis of the holder body and the front or forward end of the holder body is beveled at the location of each socket, the plane of the bevel being normal of the axis of the respective socket so as to provide a flat seating surface at the margin of the socket opening. Also the side wall of the holder body 1 is drilled and tapped at the location of each socket to receive a setscrew 6 by means of which the cutting tool or, as shown a diamond-carrying plug or nib can be secured when seated in the socket.

The position angle of the several sockets may be as desired for particular cutting tools or cutting operations and in the embodiment shown, the three sockets 3, 4 and 5 are formed at an angle of 10°, 15° and 25° respectively relative to the axis of the holder body 1. Thus the cutting tool or cutting element when positioned in any one of the three sockets, will be disposed relative to the axis of the holder body at the same angle as the axis of the particular socket chosen. For example, the diamond-carrying nib 7 shown in Fig. 1, is positioned in the socket 5 having an angle of 25° relative to the axis of the holder body.

During a cutting or dressing operation, the level of the tip 8 and the position of the cutting tool or cutting element must always be the same relative to the work on which the cutting operation is being performed. Therefore, the tool holder must be rotated to bring the selected one of the sockets into operating position. In the form of tool holder shown it will be apparent, however, that as the cutting element 7 is shifted from one socket to another to change the angle of approach of the point or tip 8 with respect to the work, the level of the point 8 relative to the axis of the tool holder 1 will be changed, due to the differences in position angle of the several tool sockets. Such change in level of the cutting tip must be compensated by vertical shifting of the holder body to keep the cutting point at the same position or cutting line on the work.

In the present invention, such vertical shifting of the tool holder relative to the cutting line on the work is accomplished automatically, as the tool holder is rotated to bring selected ones of the sockets into operative position, by locating the tool holder mounting shank 2 with its axis concentric with the loci of or equidistant from the tip 8 of the cutting tool 7 when in its several angular positions in the cutting tool head.

Thus as the tool holder body is rotated about the axis of the shank to bring a selected one of the angular sockets into operative position, the tool holder body will be shifted, according to the eccentricity of the shank to keep the working position of the tip 8 of the cutting tool at the correct level relative to the work, regardless of what the angle of approach, or the angle of the axis of the respective tool socket, may be.

The position or location of the axis of the shank 2 is determined by first finding a common axis of rotation for the cutting tool tip, relative to the axis of the tool holder, for all of the angular positions that the cutting tool will assume when positioned in the several sockets of the tool holder. The shank 2 is then located with its axis concentric with the common axis thus found, such common axis being equidistant from all of the several tip positions.

It will be understood that the same cutting tool will be used in shifting from one angular position to another or, if several tools are used, such tools will all be of substantially the same dimensions. Also it is preferable that the cutting tool such as the nib 7 has a shoulder 9 which will abut flatly against the beveled surface at the margin of the socket opening so that the tip of the cutting tool 7 will always be the same distance from the beveled surface of the head of the tool holder when seated and secured in the tool socket.

Figure 7:
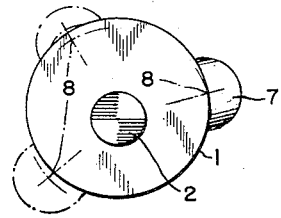
Figure 7 is a back end view of the holder showing the relation of the holder shank with the holder body and the loci of the cutting tool tips.
Figure 6:
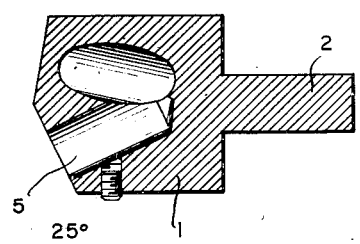
Figure 6 is a sectional view as taken on line 6—6 of Figure 3.

It will be apparent that the path of the tip 8 of the cutting tool, during rotation of the tool holder about the axis of the eccentric shank 2, will not be identical for all sockets due to the variations in the angle of the axes of the sockets. However, the axis of the shank 2 will be common to and equidistant, radially, from all positions that the tip may assume as the cutting tool is shifted from one socket to another. This relationship is illustrated in Fig. 7 wherein it will be seen that the axis of the shank 2 is equidistant from the position of the cutting tool tip 8, regardless of the socket in which the cutting tool may be mounted; the loci of the tip 8 in its several socket positions being indicated by the broken line circle.

Figure 8:
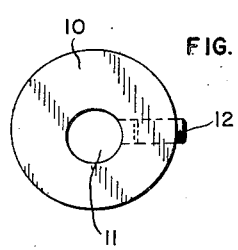
Figure 8 is an end view of an adapter shaft having an eccentrically positioned end opening to receive the shank of the tool holder and by means of which initial adjustment of cutting tool level can be quickly obtained.

As shown in Fig. 1 the cutting tool holder is mounted in an adapter shaft 10 for ready mounting in an adapter holder positioned on a grinder or shaper bed and, as indicated in Fig. 8, the adapter shaft 10 is provided with an eccentrically positioned end opening 11 adapted to receive the shank 2 of the cutting tool head 1, the shank of the cutting tool head being secured in position in the adapter end opening 11 by means of a suitable setscrew 12.

The purpose of the eccentric end opening in the adapter shaft 10 is for initial adjustment of the level of the cutting tool tip relative to the work when the tool is being set up in the adapter holder or mounting device on the grinder or shaper bed.

As is well known in the practice, rough adjustment of the level of the tip of the cutting tool is obtained in the adapter holder and final more exact adjustment of the position of the cutting tool tip is obtained by merely rotating the adapter shaft 10 while holding the head 1 loose in the adapter socket 11 but with the cutting tool tip in correct working position, the eccentricity of the adapter socket 11 causing slight lateral adjustment of the tool holder or head 1 as the adapter shaft 10 is turned.

The adapter shown in Fig. 1 and Fig. 8 is a standard Norton adapter and its manner of use as herein described is well known to those of ordinary skill in the machinist's art. Therefore, details of the adapter holder, grinder or lathe bed, etc. are not shown. It will be understood however, that an adapter shaft as shown need not be used and that, rather, the shank 2 may be of suitable size and length for direct mounting in the adapter holder on the shaper or grinder bed. If such is the case, rotation of the head 1 is accomplished by mere rotation of the enlarged shank in the adapter holder or other mounting means; the axis of the enlarged shank, of course, being common with an axis equidistant from the several positions that the tip of the cutting tool may assume in being shifted from one tool holder socket to another.

In order to facilitate proper positioning of the cutting tool, relative to the cutting level on the work, as the holder is rotated to obtain different cutting angles for the tool, the holder 1 may be provided with indices or notches 13, appropriately marked, which will aid the user in aligning the tool; the indices 13 being preferably located where they can be readily sighted.

The main advantages of this invention reside in the simplicity of its construction and the simple manner whereby the angular position of the cutting tool may be varied while maintaining a predetermined cutting level relative to the work. Another advantage resides in the arrangement of a rotatable tool holder wherein the cutting point level of the cutting tool is automatically maintained for any of the several different cutting or dressing angle positions of the cutting tool.

Other advantages reside in the arrangement of flat beveled portions at the socket end of the tool holder which provides an abutment against which a shoulder on the cutting tool may seat to assure that the cutting tool will always be properly set when fastened in a selected one of the several sockets.

Although but one specific embodiment of this invention is herein shown and described, it will be understood that details of the construction shown may be altered or omitted without departing from the spirit of this invention as defined by the following claims:

I claim:

1. A device of the class described comprising a head having a plurality of angularly spaced sockets in one end, said sockets each being adapted to receive a cutting tool and each socket axis being at a different predetermined angle relative to the axis of said head, and an eccentrically located shank extending axially from the other end of said head, said shank having its axis radially equidistant from the positions of the tip of a cutting tool seated in said sockets selectively.

2. A device of the class described comprising a head having a plurality of angularly spaced sockets in one end each adapted to receive and hold a cutting element, each socket axis being at a different angle relative to the axis of said head, and a shank extending from the other end of said head, the axis of said shank being concentric with the loci of the tip of a cutting element positioned selectively in different ones of said sockets.

3. A device of the class described comprising a head having a plurality of angularly spaced sockets in one end each adapted to receive and hold a cutting element, each socket axis being at a different angle relative to the axis of said head, said one end of said head being beveled normal to the respective socket axis at each socket opening, and a shank extending from the other end of said head, the axis of said shank being concentric with the loci of the tip of a cutting element positioned selectively in different ones of said sockets.

4. A device of the class described comprising a head having a plurality of angularly spaced sockets in one end each adapted to receive and hold a cutting element, each socket being at a different angle relative to the axis of said head, said one end of said head being beveled normal to the respective socket axis at each socket opening, a shank extending from the other end of said head, the axis of said shank being concentric with the loci of the tip of a cutting element positioned selectively in different ones of said sockets, and means to lock a cutting element in each of said sockets.

5. A device of the class described comprising a head having three angularly spaced sockets in one end each adapted to receive and hold a cutting tool, each socket axis being at a different predetermined angle relative to the axis of said head, and a shank extending from the other end of said head, the axis of said shank being concentric with the loci of the tip of a cutting tool positioned selectively in different ones of said sockets.

6. A device of the class described comprising a head having three angularly spaced sockets in one end each adapted to receive and hold a cutting tool, each socket axis being at a different predetermined angle relative to the axis of said head, said one end of said head being beveled normal to the respective socket axis at each socket opening, and a shank extending from the other end of said head, the axis of said shank being concentric with the loci of the tip of a cutting tool positioned selectively in different ones of said sockets.

7. A cutting tool holder comprising a head having a plurality of beveled portions at one end each at a different angle relative to a plane normal to the axis of said head, said head having a socket in each beveled portion normal thereto and adapted to receive a cutting tool, and a shank extending from the other end of said head, said shank having its axis radially equidistant from the location of the tip of a cutting tool when positioned selectively in different ones of said sockets.

8. A tool holder comprising a head having three flat angularly spaced beveled portions at one end, each of said beveled portions being at a different predetermined angle relative to a plane normal to the axis of said head, said head having a socket in each beveled portion normal thereto and adapted to receive a cutting tool, and an eccentrically located shank extending axially from the other end of said head, said shank having its axis equidistant from the positions of the tip of a tool when disposed selectively in different ones of said sockets.

SHELDON M. BOOTH.

REFERENCES CITED

The following references are of record in the file of this patent:

UNITED STATES PATENTS

| Number | Name | Date |
| --- | --- | --- |
| 2,324,942 | Meeson et al. | July 20, 1943 |
| 2,395,662 | Hoagberg | Feb. 26, 1946 |

FOREIGN PATENTS

| Number | Country | Date |
| --- | --- | --- |
| 673,470 | France | Oct. 8, 1929 |